Oct. 18, 1966

H. JUNG ETAL 3,279,296

ROTARY SHEET CUTTING APPARATUS

Filed Sept. 2, 1964

2 Sheets-Sheet 1

INVENTORS:
HANS JUNG
LUDWIG RAICHLE
WERNER SCHIEK

BY Margace, Johnston, Cook & Root

ATT'YS

INVENTORS:
HANS JUNG
LUDWIG RAICHLE
WERNER SCHIEK

ATT'YS

3,279,296
ROTARY SHEET CUTTING APPARATUS
Hans Jung, Ludwigshafen (Rhine), Ludwig Raichle, Limburgerhof, Pfalz, and Werner Schiek, Ludwigshafen (Rhine), Germany, assignors to Badische Anilin- & Soda-Fabrik Aktiengesellschaft, Ludwigshafen (Rhine), Germany
Filed Sept. 2, 1964, Ser. No. 394,083
Claims priority, application Germany, Sept. 6, 1963, B 73,414
4 Claims. (Cl. 83—664)

This invention relates to apparatus for cutting sheeting preferably thin plastics film with cutter wheels mounted on opposite shafts.

The use of circular blades rigidly spaced in axial direction on a shaft is known for cutting sheeting. When circular blades of spring steel are used, the axes of the two blade shafts are arranged in skewed relationship. By displacing one shaft in the axial direction, the individual blades are brought into engagement with the opposed circular blades. It has been found that it is not possible in this way to produce satisfactorily cut tapes.

In the case of roller cutting, the two axes of the blade shafts are parallel. The tapes are cut by shearing the sheeting at the edges. Tapes cut in this way also cannot be wound up satisfactorily.

In the score-cut-method, the blade is pressed against a hardened roll. This method is also not suitable for the production of precision cut tapes because deformation occurs at the edges of the tape. The same is true of cutting with a razor blade.

It is an object of the present invention to provide a cutting means which produces exactly the same changes at both cut edges of the tape.

Another object of the invention is a cutting means which cuts in such a way that the strain hardening of the tape is equal at both edges. This requirement, coupled with the additional condition that the edges of the tape should not be deformed during cutting and particularly after cutting, is fulfilled by the apparatus for cutting sheeting with cutter wheels according to this invention.

Apparatus for cutting sheeting in accordance with the present invention comprises cutter wheels loosely mounted on a guide shaft so as to be freely movable in axial direction, a power-driven shaft, parallel with said guide shaft, which transmits cutting force to cutter wheels secured by longitudinal keys to said motor driven shaft, and elastic, sprung spacer rings mounted on the power-driven shaft between the circular blades thereon.

Figure 1:
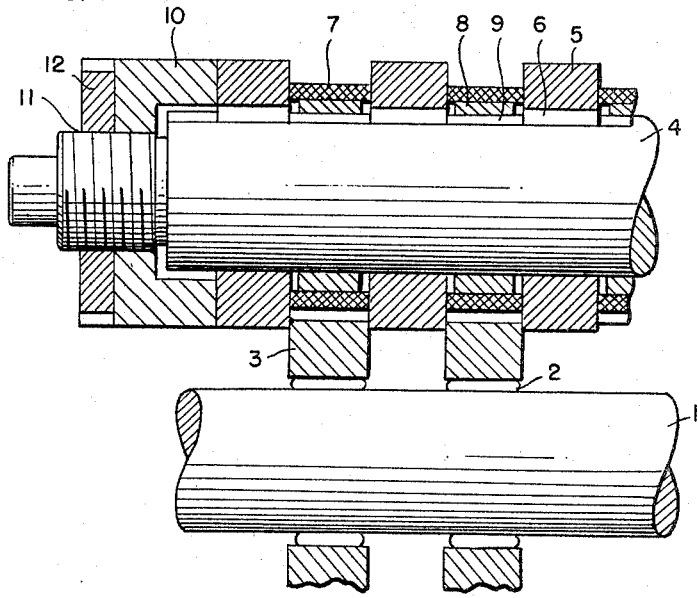
Figure 2:
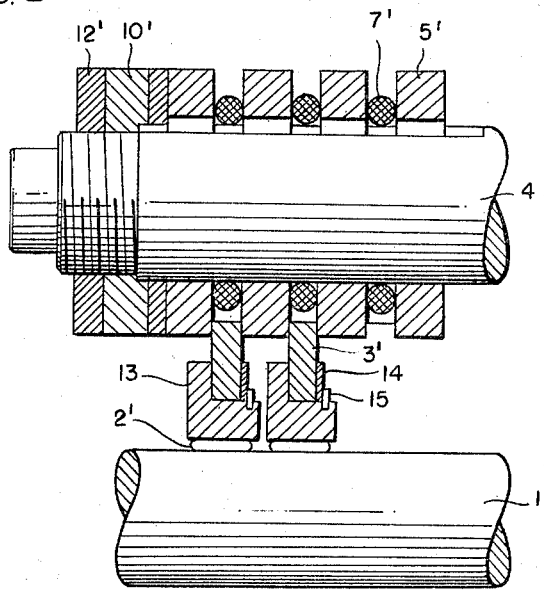
Figure 3:
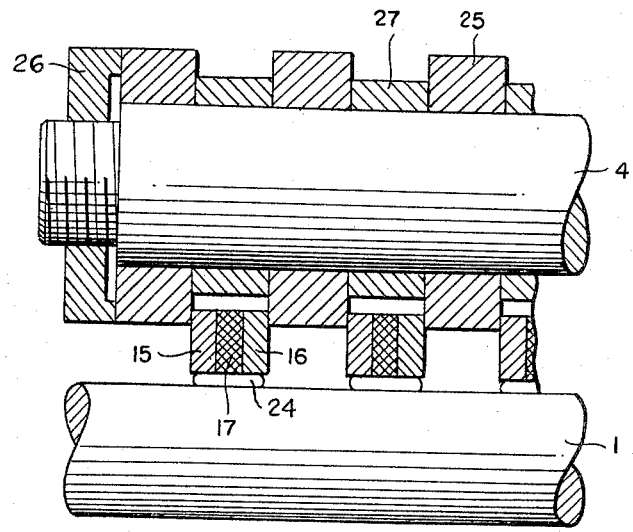
Figure 4:
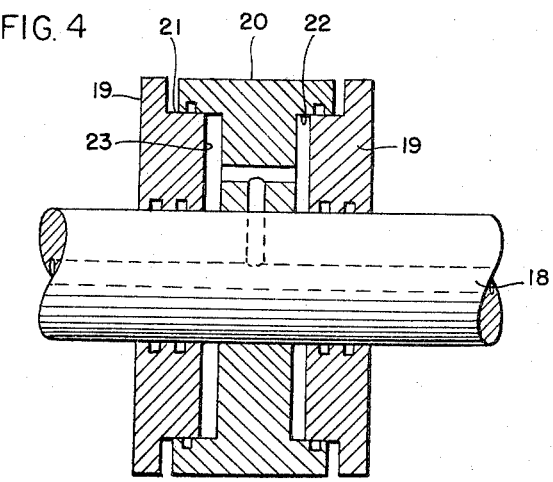

Embodiments of apparatus according to the invention are shown by way of example in the accompanying drawings in which:

FIGURES 1 to 3 show embodiments having elastic spacers and FIGURE 4 shows an embodiment in which the cutting force is produced hydraulically.

Referring to FIGURE 1, a plurality of cutter wheels 3 are mounted loosely on a guide shaft 1, for example with the interposition of needle bearings 2. The cutter wheels 3 may be easily rotated and displaced axially. Cutter wheels 5 are mounted on a drive shaft 4 between the individual cutter wheels 3; the cutter wheels 5 are secured to the drive shaft 4, for example by keys 6, so that they may easily be displaced axially. The spaces, corresponding to the width of the cutter wheels 3, between the cutter wheels 5 on the drive shaft 4 are occupied by elastic spacers 7, for example of rubber. The spacers 7 are carried by rings 8 and are mounted through keys 9 on the drive shaft 4 so as to be movable axially. The cutter wheels 5 and the spacers 7 are pressed together by means of a compression nut 10 and locknut 12 secured on the end of the drive shaft 4 on a screwthread 11.

The position of the compression nut 10 on the shaft 4 is fixed by a locknut 12. If the compression nut 10 is unscrewed, the cutter wheels 5 are forced apart by the expanding spacers 7.

The cutter wheels 3 on the guide shaft 1 are not driven but rather are loosely mounted on the shaft 1 so that they may easily be rotated and moreover displaced axially. It is important, particularly when cutting thin film, that the angle of contact of the sheeting being supplied and of the tapes being withdrawn should be as large as possible. Contrasted with prior art cutting methods, the cutter wheels penetrate farther in the apparatus according to this invention, i.e. they have a greater length of contact at the periphery. The advantage achievable with this cutting means lies in the uniform cutting and in the accurate maintenance of the width of the tape.

Another embodiment of apparatus according to this invention is shown in FIGURE 2. In this apparatus a waste strip is cut out between the individual tapes by relatively narrow cutter wheels 3' which are secured in hubs 13 by means of discs 14 and tension rings 15, the hubs 13 being mounted loosely on the guide shaft 1 by means of needle bearings 2'. Annular rubber rings 7' act as elastic spacers between the cutter wheels 5' keyed to the driven shaft 4 and secured in place by means of a compression nut 10' and locknut 12', in a manner similar to the embodiment shown in FIG. 1. This cutting method has the advantage of good cutting and, moreover, the cut tapes may be wound up side by side on one shaft.

FIGURE 3 shows another embodiment of cutting means. In this embodiment, the cutter wheels mounted loosely on the shaft 1 with needle bearings 24 are subdivided into two cutter rings 15 and 16 between which is provided an elastic sprung spacer ring 17, for example of rubber, to ensure the cutter wheels being pressed on the driven wheels 25 on the opposite shaft and to maintain equal edge pressures. The driven cutter wheels 25 are firmly secured by the compression nut 26 onto the driven shaft 4 and are separated in this case by rigid spacers 27 having a width which will place the cutter wheels on shaft 1 under the desired compression.

FIGURE 4 shows by way of example the provision in the drive shaft of a bore 18 for supplying a medium under pressure, for example oil. The cutter wheel in this case is subdivided into three parts, namely two outer cutting members 19 and an inner member 20. The outer members 19 have an external cylindrical surface 21 which slides in a cylindrical bore 22 in the inner member 20. If oil under pressure is forced through the bore 18 to act on the free surface 23 of the outer members 19, these are forced apart. In this way the cutting force of the whole cutter wheel at the outer edges is the same and this force is independent of any length or diameter tolerances of the cutter wheel on the drive shaft.

For the cutting means according to this invention it is important that by mechanical means a constant pressure is achieved at the cutting edges of all cutter wheels so that the deformations occurring at both edges of the tape are equal.

We claim:
1. Apparatus for cutting sheeting of a thin plastic film comprising: a rigidly mounted guide shaft; cutter wheels mounted loosely on said guide shaft at intervals so as to be capable of both axial and rotational movement thereon; a power driven shaft parallel to said guide shaft; driven cutter wheels mounted for rotation with said drive shaft and axially slidable thereon for spaced adjustment at distances corresponding to and fitting into the spaces between said cutter wheels on said guide shaft such that each of said driven cutter wheels has a portion of its peripheral side surfaces in contact with the corresponding peripheral surfaces of the adjacent pair of cutter wheels loosely mounted on said guide shaft; and means coupling said driven cutter wheels to each other so as to resiliently urge the peripheral surfaces on each side thereof with uniform pressure against the corresponding peripheral surface of the adjacent cutter wheel loosely mounted on said guide shaft.

2. Apparatus as claimed in claim 1 wherein said coupling means comprises elastic, sprung spacer rings keyed for axial slidable movement on said drive shaft between each of the driven cutter wheels and a compression nut with a lock nut at one end at least of said drive shaft for placing the coupled assembly under compression.

3. Apparatus as claimed in claim 1 wherein said cutter wheels mounted loosely on said guide shaft are substantially narrower than said driven cutter wheels.

4. Apparatus as claimed in claim 1 wherein said coupling means comprises a hydraulic fluid supplied under pressure thorugh said driven shaft to the interior of each of said driven cutter wheels which is so constructed to permit expansion of the outer cutting elements thereof as pistons in a central cylindrical bore.

References Cited by the Examiner
UNITED STATES PATENTS
3,173,326  3/1965  Gulliksen et al. ____ 83—664 X
FOREIGN PATENTS
1,091,372  4/1955  France.

WILLIAM S. LAWSON, Primary Examiner.